Patented Feb. 4, 1936

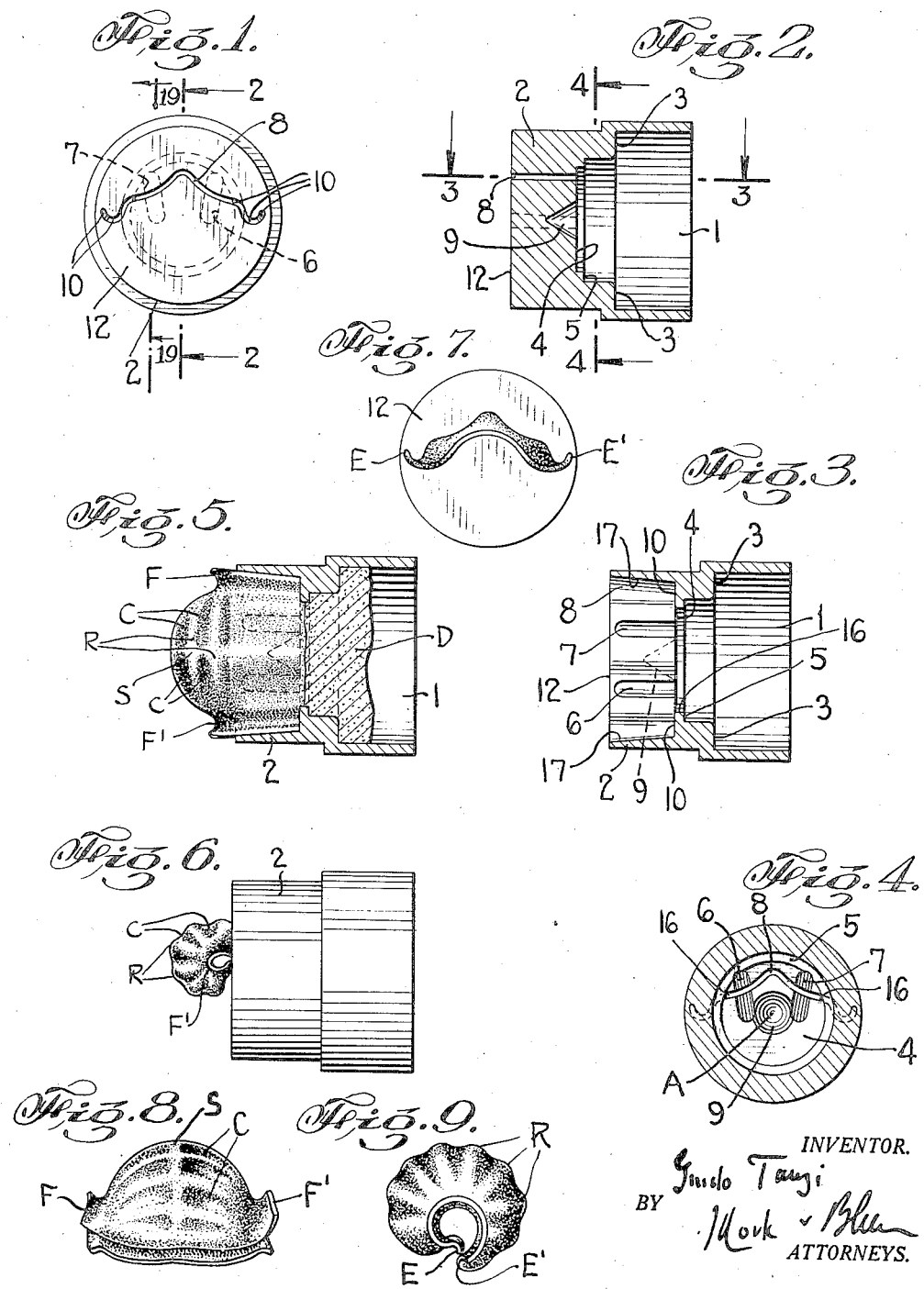

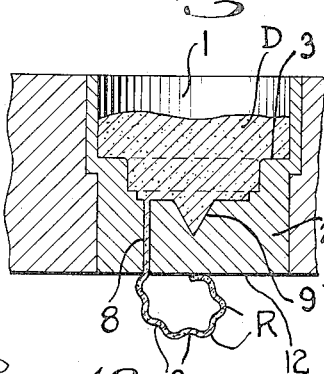
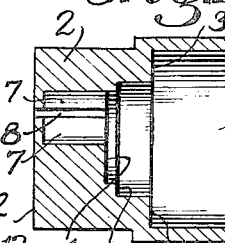
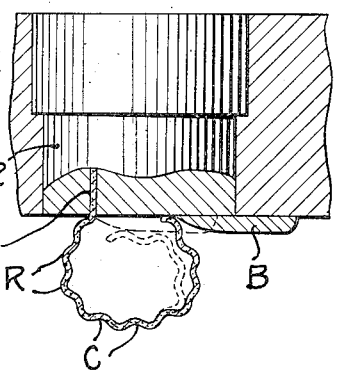
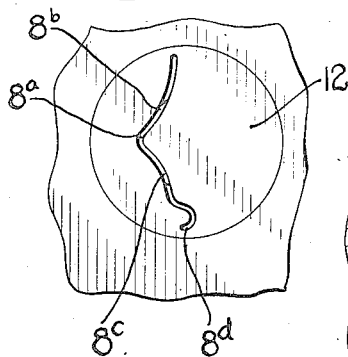
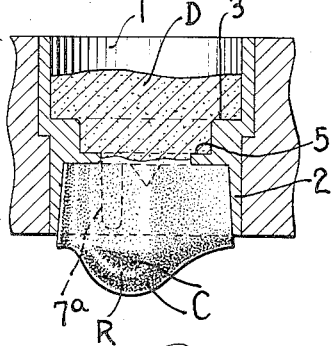
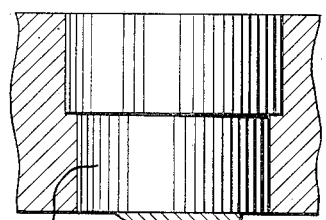
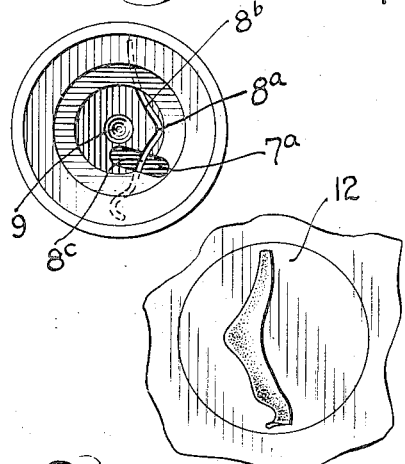
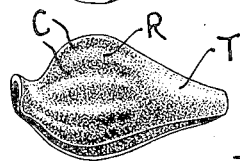
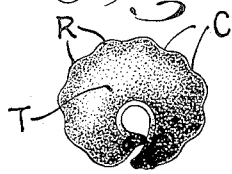

2,029,684

UNITED STATES PATENT OFFICE 2,029,684

PROCESS FOR MAKING DOUGH FORMS AND PRODUCT

Guido Tanzi, Brooklyn, N. Y., assignor, by mesne assignments, to B. Filippone & Co. Inc., Passaic, N. J., a corporation of New Jersey Application March 25, 1933, Serial No. 662,672

5 Claims. (Cl. 107—54)

My invention relates to a new and improved mechanism for producing dough forms, a new and improved method of making the same, and a new and improved dough form.

One of the objects of my invention is to provide a thin dough form of superior ornamental appearance.

Another object of my invention is to produce a dough form which shall have the shape of a substantially closed hollow body, said body having its wall formed of thin dough, said wall being preferably corrugated so as to provide increased strength.

Another object of my invention is to provide a dough body which is open either at the ends or at some other point thereof, so that water can penetrate into the interior of said body when the same is cooked.

Other objects of my invention will be set forth in the following description and drawings which illustrate a preferred embodiment thereof, it being understood that the above general statement of the objects of my invention is intended merely to generally explain the same and not to limit it in any manner.

Fig. 1 is a front view illustrating one of the dies which is used for carrying out the invention.

Fig. 2 is a sectional view on the line 2—2 of Fig. 1.

Fig. 3 is a sectional view on the line 3—3 of Fig. 2.

Fig. 4 is a sectional view on the line 4—4 of Fig. 2.

Fig. 5 is a view similar to Fig. 3 showing how the dough is extruded.

Fig. 6 is a side elevation of Fig. 5.

Fig. 7 is a front view, showing the extruded dough.

Fig. 8 is a side elevation of the completed dough form.

Fig. 9 is a front elevation of Fig. 8.

Fig. 10 is a sectional view illustrating the die which is shown in Fig. 3. In Fig. 10 the die is illustrated with its axis in the vertical position, as this is the position in which the device is actually used. Fig. 10 likewise illustrates how the extruded dough curls upwardly.

Fig. 11 is an elevation which illustrates the die shown in Fig. 10. This view shows the shape of the dough, after the extrusion has gone beyond the point shown in Fig. 10, and just before the cutting operation.

The dotted lines shown in Fig. 11 illustrate the progress of the cutting operation.

Fig. 12 is a view similar to Fig. 11 showing the shape of the severed piece of dough and also showing how the pieces of dough fall upon a screen which is reciprocated in a horizontal plane.

Fig. 13 is a front elevation showing a different form of die.

Fig. 14 is a sectional view of the die shown in Fig. 13.

Fig. 15 is a view similar to Fig. 13 showing the shape of the extruded dough.

In Figs. 13 and 15 the dies are shown with their axes in a horizontal plane, but it is to be understood that in actual use these dies are held with their axes vertical.

Fig. 16 is a rear view of the die which is shown in Fig. 13.

Fig. 17 is a side elevation showing the shape of the piece of dough which is made with the use of the die which is illustrated in Figs. 13–16.

Fig. 18 is an end view of the piece of dough which is shown in Fig. 17, this view being taken at the right-hand side of Fig. 17.

Fig. 19 is a partial section on the line 19—19 of Fig. 1.

The dough form may be generally referred to as macaroni, and the dough is made of any suitable ingredients.

While I have illustrated a single die, it is to be understood that a group of said dies, of any desired number, can be assembled with a holder of suitable size and that the dough is forced through said holder and through said dies at a pressure of about two thousand (2000) pounds per square inch.

Referring to Figs. 2, 3, and 5, the dough is forced into the inlet 1. Said inlet 1 may be connected to a large holder for the dough so that a number of the dies are mounted upon the front face of said holder. The inlet 1 communicates with a front portion 2.

Referring to Figs. 2 and 4, the die has an annular lateral wall 3 at the inner end of the inlet 1 and the die is also provided with another lateral wall 4. This lateral wall 4 is separated from the annular wall 3. The lateral wall 4 is of smaller diameter than the annular wall 3, so that an intermediate annular wall 5 is formed.

As shown in Figs. 3 and 4, recesses 6 and 7 extend forwardly from the wall 4, and the front ends of said recesses are spaced from the front wall 12 of the die. Said recesses 6 and 7 are inclined to each other and each of said recesses has a substantial elliptical shape. Each said recess has an edge which extends laterally beyond the central axis A of the die and the other edges of said recesses 6 and 7 extend beyond the adjacent edge of the inner lateral wall 4, so that said recesses 6 and 7 intersect the annular wall 5.

The recesses 6 and 7 are intersected by a cross bore or slot 8 which extends to the front wall 12. The cross bore or passage 8 tapers outwardly, so that the front end thereof which is shown in Fig. 1, is much wider than the rear end thereof, which is shown in Fig. 4.

The dotted lines in Fig. 4 indicate the outward flare or taper of the cross bore 8.

It will be noted that Fig. 3 is taken along a sectional line which follows the lateral contour of the cross bore 8, so that Fig. 3 clearly shows the horizontal outward taper of said bore 8.

Referring to Fig. 4, the inner end of the cross bore 8 extends to the edge of the lateral wall 4. The inner lateral wall 4 is provided with a conical countersunk recess 9.

Referring to Fig. 3, the inner end of the bore 8 corresponds to the points 10, and the lateral wall of said bore is indicated by the reference numeral 17.

The dough D is forced into the recesses 6 and 7, and out through the passage 8. This passage 8 is narrow, so that the dough is extruded in the form of a thin sheet.

Referring to Figs. 10 and 11, when these dies are used, they are held with their axes vertically. Since the dough is extruded more rapidly through that portion of the passage or slot 8, which is aligned with the recesses 6 and 7, the extruded dough curls upwardly and a series of the ribs R are formed therein. The extruded dough contacts with the face of the die, as shown in Fig. 11, and a cutting blade B is then operated in order to sever a piece of dough, which has the shape shown in Fig. 12. The dough at this time has enough moisture therein so that it is plastic and bendable.

The severed pieces of dough fall upon a screen M which is made of any suitable wire mesh and this screen is reciprocated back and forth while it is located in a horizontal plane. The dough forms are therefore shaken until their edges overlap each other by reason of their contact with the wire mesh of the screen M, and also by reason of the contact of the dough forms with each other, while they are being shaken. This produces the completed dough form which is shown in Figs. 8 and 9.

The inclination between the recesses 6 and 7 is relatively small, and preferably does not exceed 20°.

The improved dough form is longitudinally curved throughout save for the bottom face which is relatively flat.

The longitudinal bottom edges E and E' preferably overlap each other and they are spaced from each other. Likewise, and as shown in Fig. 8, the depressions C are spaced from each other by an intermediate lateral portion S which forms a strengthening rib.

After the dough forms have been shaped, they are allowed to dry, whereupon the dough becomes sufficiently hard to cause said forms to retain the shape which has been described.

Of course, when the dough is extruded, it is soft and plastic so that the action of the cutting blade (which has a straight edge) can bring the edges E and E' towards each other.

The recesses 6 and 7 facilitate the ready extrusion of the dough in the form of a thin sheet because said recesses 6 and 7 are sufficiently large in order to permit the dough to readily enter the same. Since the front ends of said recesses 6 and 7 extend close to the front wall 12 of the die, the dough can spread laterally from said recesses 6 and 7 into the intersecting cross passage 8.

The embodiment shown in Figs. 13-15 inclusive is generally the same as that shown in the previous figures, save that the die has a single recess 7a, which generally corresponds to the recess 7. Likewise the cross passage or slot 8a generally corresponds to the cross passage or slot 8, save that said cross passage 8a has one concave-convex branch 8b on one side thereof, a similar branch 8c on the other side thereof, and an extension 8d of the branch 8c.

The sheet of dough which is thus extruded is shown in Figs. 17 and 18 and this piece of dough has a heart shape, it being provided with ribs R, as in the embodiment shown in Figs. 8 and 9. Likewise the dough form which is shown in Fig. 17 is provided with a relatively narrow and tapered part T which does not have any ribs.

That is, since this embodiment only has one recess 7a, that part of the extruded dough which is generally aligned with said recess is formed with ribs, and the other part of the dough is formed without ribs. Likewise the difference in shape between the two branches or parts of the slot 8a, causes the production of the heart shape which is shown in Fig. 17.

While I have shown preferred embodiments of my invention, I do not wish to be limited to the details or to the specific shapes which have been illustrated herein.

In the broader aspect of my invention, it generally covers a tube-like dough body having separated longitudinal edges. The invention also covers a tube-like body having constricted ends and it also covers numerous other varieties as set forth in the claims.

It will be noted that when the sheet of dough is extruded, said sheet is of general concavo-convex shape. That is, referring to Fig. 7, a central part of the sheet of dough is concave, and the edge portions thereof are convex.

When the fresh dough is extruded, it has an arched cross-section. The completed article is transversely and longitudinally arched, so that the dried article has considerable rigidity and it maintains its shape under ordinary handling. The article retains its shape when it is cooked. I do not wish to be limited to an article which is arched both longitudinally and laterally.

Since the dough is extruded more readily through that part of the slot 8 which is aligned with the longitudinal recesses or recess (6 and 7, or 7a), the part of the downwardly extruded sheet of dough which is aligned with said recess or recesses, tends to move downwardly at greater speed than the remainder of said sheet of dough. This produces a relative difference in the speed of extrusion of the downwardly moving sheet of dough, so that a differential effect is secured, thus causing the upward curling of the sheet of dough which is illustrated in Figs. 10 and 11. This also causes the formation of the spaced ribs R, which are formed laterally along the extruded sheet of dough when it curls upwardly. The drawings accurately represent the proportions of the various parts of the dies.

I claim:—

1. A dough body of arch-like form and having constricted end portions, said body having longitudinal ribs which are spaced from each other, said ribs having depressions intermediate the same, said body having a lateral zone which is free from said depressions.

2. A hollow dough form which is laterally arched and having one end thereof larger than the other end, the larger end having spaced longitudinal ribs, and the smaller end having a smooth surface.

3. A method of producing a hollow dough form which consists in extruding a sheet of dough, and bending the free end of said dough in a direction which is reverse to the direction of extrusion, while causing longitudinal ribs to be formed in the free end of said dough after it has been extruded, and then cutting said dough in a direction substantially parallel to said ribs.

4. A method of forming a dough body which consists in extruding a thin sheet of dough, bending said sheet of dough while it is extruded, and then severing the sheet of dough so as to produce a dough body having separated and non-overlapping edges, and then shaking the severed piece of dough so as to bring its edges closer to each other.

5. A method of forming a dough body which consists in extruding a thin sheet of dough, bending said sheet of dough while it is extruded, and then severing the sheet of dough so as to produce a dough body having separated and non-overlapping edges, and then shaking the severed piece of dough so as to bring its edges close to each other and in overlapping relation.

GUIDO TANZI.